Figure 1:
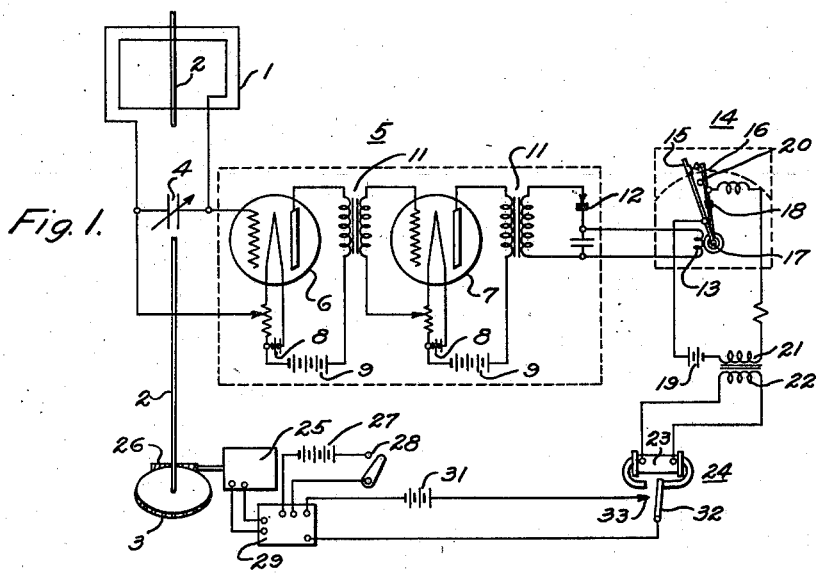

June 7, 1932.   D. G. LITTLE   1,862,119

AUTOMATIC DIRECTION FINDER

Filed Sept. 2, 1926

WITNESSES:

INVENTOR
Donald G. Little.
BY
ATTORNEY

Patented June 7, 1932

1,862,119

UNITED STATES PATENT OFFICE

DONALD G. LITTLE, OF EDGEWOOD, PENNSYLVANIA, ASSIGNOR TO WESTINGHOUSE ELECTRIC & MANUFACTURING COMPANY, A CORPORATION OF PENNSYLVANIA

AUTOMATIC DIRECTION FINDER

Application filed September 2, 1926. Serial No. 133,180.

My invention relates to radio receiving systems, and it has particular relation to directional systems.

One object of my invention is to provide a system that will automatically give an indication of the direction from which signals are being received.

Another object of my invention is to provide, in systems of the type referred to above, means for automatically orienting a radiant-energy receptor, such as a loop, to the position in which it will receive a maximum amount of energy from a predetermined transmitting station.

Another object of my invention is to provide a directional receiving system that requires minimum attention on the part of the operator.

Another object of my invention is to provide a radio direction-finding system in which a plurality of geographically separated radio receiving stations are so interconnected that indicating mechanisms at each station will automatically locate on a map the approximate position of a source of radio signals.

Still another, and more specific object of my invention, is to provide, in a directional receiving system, an automatically rotating loop so arranged that the incoming signals will govern the amount of rotation thereof about the position affording maximum signal strength.

In the operation of directional receiving systems, of the type now generally used for position finding on ship-board and for analogous purposes, it is customary to employ a rotatable loop as the radiant-energy receptor.

The loop is slowly turned about a vertical axis until the direction of minimum signal strength is determined, this direction being at right angles to the direction from which the signals are being received. Inasmuch as the determination of the position of minimum signal strength is entirely dependent upon the personal judgment of the operator, the likelihood of error is great. The minimum-signal position is not critical, a variation of a few degrees at either side thereof affecting the received signal strength but slightly.

By my invention, I have entirely eliminated the human equation from the determination of signal direction. In a preferred embodiment, I provide a loop, tuned to the desired signal frequency, with actuating means for causing it to oscillate slowly about a vertical axis. The angle swept by the loop is controlled by the strength of the incoming signal, the motion being periodically reversed as the loop turns a definite amount to each side of the position of maximum signal strength. The mid-point of the swing may then be noted visually, if desired, or suitable apparatus may be provided for making a permanent record thereof.

The novel features which I believe to be characteristic of my invention are set forth with particularity in the appended claims. My invention itself, however, both as to its organization and method of operation, will best be understood by reference to the following description, taken in connection with the accompanying drawing, wherein Figure 1 is a diagrammatic view of a preferred form of my invention, and Fig. 2 is a diagram illustrating the operation of my invention.

Figure 3:
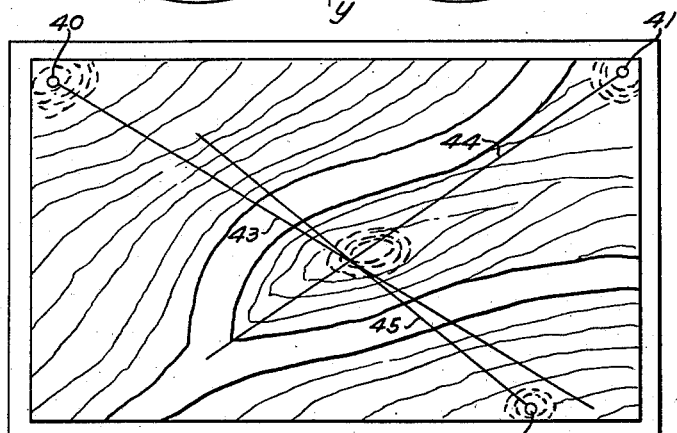

Fig. 3 is a diagrammatic view of a portion of a system according to my invention, wherein the location of a radiant-energy source may be indicated at a plurality of separate stations.

Figure 2:
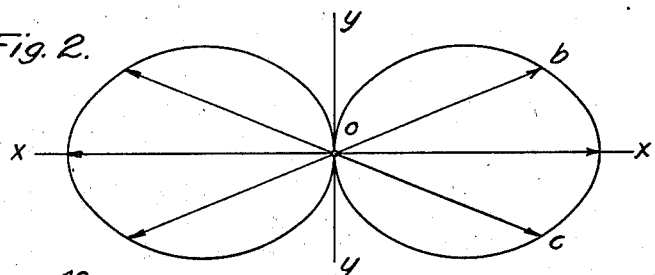

Referring specifically to Fig. 1, a loop, is supported on a vertical shaft 2 that carries a gear wheel 3 on its lower end. The loop 1 is provided with a tuning condenser 4 and it is connected to an amplifier-detector unit.

The amplifier may comprise a plurality of thermionic devices 6 and 7, each provided with the usual A and B batteries 8 and 9, and coupled together through radio-frequency transformers 11, chokes or resistance, as is well known in the art. The detector 12 may either be one of the usual crystal type or it may be a thermionic tube, if desired.

The output of the detector is passed through a coil 13 which forms a part of a direct-current ammeter 14. This ammeter carries two arms, a main indicating arm 15 and a contact making arm 16, both mounted on a shaft 17, the latter arm being insulated from the shaft 17 by an insulating member 18. The main indicating arm 15 and the contact-making arm 16 are connected, respectively, to opposite poles of a battery 19, the circuit being completed through a transformer primary coil 21, the secondary 22 of which is connected in series with an actuating coil 23 of a polarized relay 24.

A motor 25 is arranged to actuate a suitable train of mechanism for giving rotational movement to the loop, the mechanism comprising a worm 26 and the gear 3 previously referred to. A source, which may be a battery 27, if desired, provides power for the motor, and a switch 28 controls the application of such power.

The direction of rotation of the motor is controlled by a reversing mechanism 29, which may be any type familiar to those skilled in the art. The reversing mechanism 29 is, in turn, controlled by the polarized relay 24, the control circuit comprising a battery 31, a contact carried by the armature 32 of the relay 24, and fixed contact 33.

When it is desired to determine the direction from which a desired signal is being received, the switch 28 is first closed, which energizes the driving motor 25, the direction of rotation being determined by the position of the contacts in the reversing mechanism 29. The loop starts to slowly rotate around its axis, and, as its plane begins to approach the plane determined by such direction from which the signals are being received, such signal is amplified by the amplifier stages 5 and rectified by the detector 12.

The manner in which a direct current may be obtained from the incoming signal is familiar to those skilled in the art, and, for that reason, is not described in detail.

The rectified current causes a deflection of the main arm 15 of the ammeter 14 toward the right, clearing a stop-pin 20, and, as soon as such deflection is sufficient, the contacts carried by the main arm and the contact-making arm are closed, completing a circuit which can be traced through the battery 19 and the primary winding 21. Continued deflection of the main arm carries the contact-making arm further to the right but does not disturb the completed circuit.

Referring now to Fig. 2, the direction from which the desired signal is to be received is indicated by an axis X—X, it being assumed that the loop is to be rotated about an axis perpendicular to a plane determined by the X—X axis and a Y—Y axis, drawn at right angles thereto, the axis of rotation passing through the intersection of the two reference axes at O.

For maximum signal strength, the plane of the loop must include the axis X—X, the signal strength, in other positions, being indicated by the length of the arrows OB and OC, the angle between each arrow and the reference axis X—X representing the amount the loop has been rotated away from the position of maximum signal strength.

When the loop is in the position indicated by the arrow OB, the ammeter is deflected to the right an amount proportional to the length of the arrow. As the loop swings from the position OB, the deflection increases and is maximum when the loop has the position OX. Continued rotation of the loop past the position OX toward the position OC causes a decrease in the control current, which permits the main indicating arm of the ammeter to start to return to its initial position.

As the main indicating arm 15 starts moving to the left, the contact-making arm 16 follows it until further travel of the contact-making arm is stopped by the contact-pin 20. Continued movement of the main arm to the left breaks the circuit including the battery 19 and the transformer primary 21, initiating a current pulse in the secondary circuit including the winding 23 of the polarized relay 24. The current pulse, energizing the winding of the polarized relay, causes the contact carrier by the armature 32 to engage the fixed contact 33, completing a circuit which may be traced through the battery 31 and the reversing mechanism 29.

The reversing mechanism being momentarily energized by the battery 31, operates to apply current from the source 27 to the motor 25 in such manner as to cause its direction of rotation to change. The rotation of the loop is accordingly stopped, and then started again in the reverse direction, causing a repetition of the sequence of operations just described.

The polarized relay is not actuated when the contacts carried by the meter-arms close, it being so magnetized as to be energized only upon the breaking of the circuit controlled by such contacts.

The loop will accordingly oscillate about the position of maximum signal strength. The amplitude of oscillation is determined by the position of the stop-pin 20, since such position fixes the amount the main indicating arm must move before the contacts close or open.

The mid-point of the loop-swing obviously corresponds to the position of maximum signal strength, in which position the loop is pointing toward the source of signals. This position may be noted visually by bisecting the loop-swing angle, or additional apparatus (not shown) may be provided whereby a movable pointer may be caused to indicate upon a map the direction from which the signals are being received.

My invention is applicable to either the reception of spark or continuous-wave signals. In the case of continuous waves, it is preferable to heterodyne the incoming wave before detection, as this results in a frequency better adapted to influence the ammeter.

In Fig. 3 I have shown diagrammatically the manner in which my invention may be employed to determine the position of a moving object, such as a ship or an aeroplane. A plurality of stations, 40, 41 and 42, are each equipped with an automatic direction finder constructed according to my invention. At each station is a map of the surrounding country drawn carefully to scale and properly oriented with reference to the points of the compass, with the positions of the several stations accurately plotted thereon. Pointers 43, 44 and 45 are arranged adjacent each station-position on each map, and are remotely controlled by the automatic direction finder located at the stations corresponding thereto. For this remote control, I make use of apparatus analogous to the now well-known Telautograph, or the apparatus described under style numbers S—438309 and 310206, on page 508 of the general catalogue of the Westinghouse Electric and Manufacturing Company, 1925–1927 edition, the various stations being connected together by land-lines over which the control impulses are sent.

Assuming that the moving object carries a radio transmitter it is obvious that, at each station, the automatically controlled pointers will intersect at a point on the map which is indicative of the position of the object. It is thus possible to obtain a continuous indication of the path taken by the object under observation, and, if desirable, an automatic plotting device could be added which would periodically mark on the map the instantaneous position of such object.

By my invention, I have thus provided an automatic direction finder which requires a minimum of supervision. As an aid to navigation, its advantages are obvious. By employing two devices constructed according to my invention, a continuous indication may be obtained of a ship's position with reference to a plurality of radio-compass stations. The piloting of vessels in dangerous and unfamiliar waters may be greatly simplified, and the likelihood of ship-wreck reduced.

In time of war, the position of scouting aeroplanes may be constantly known with reference to the enemy's lines, enabling the officer in command to more effectively direct their movements. The position of enemy radio stations may be quickly and accurately determined, all errors caused by faulty observation being eliminated.

While I have shown and described my invention in its preferred form, it will be obvious to those skilled in the art that it is not so limited but is susceptible of many changes and modifications without departing from the spirit thereof. I desire, therefore, that only such limitations shall be placed on my invention as are necessitated by the prior art, or as are specifically set forth in the appended claims.

I claim as my invention:

1. In a radio system, movable radiant-energy-receiving means comprising a single loop, means for deriving a control current from received signals, contact making and breaking means actuated by said current, a polarized relay controlled by said contact-breaking means, means for causing said relay to respond to the operation of said make and break device in one direction only, means for moving the radiant-energy-receiving means, means for controlling the moving means, the last mentioned means being actuated by said polarized relay.

2. In a directional radio system, movable signal energy receiving means, a contact make and break device actuable in response to energy received by said signal receiving means, relay means associated with said make and break device, means for causing said relay to respond only on the breaking of a circuit by said contact make and break device.

3. In a system of the radio type, movable signal energy receiving means, driving means for causing movement of said radiant energy receiving means, said driving means being reversible, means for causing a periodic reversal of said driving means when said radiant energy receiving means occupies a position approximately in a plane indicative of the plane of a signal being received, said means comprising a contact make and break device, said device being responsive to the signal energy received on said signal energy receiving means and a polarized relay in circuit with said make and break device, and means associated with said polarized relay for causing said polarized relay to operate only on the breaking of the circuit by said make and break device.

4. In a radio system signal energy receiving means, a motor associated with said signal energy receiving means for causing rotation thereof into a plane indicative of the plane of a signal, and means for causing a reversal of said motor after said energy receiving means has entered said plane, said means comprising a contact make and break device actuable in response to signal energy received by said signal energy receiving means, switching means in circuit with said make and break device and operable, upon the operation of said make and break device in one direction only, to cause a reversal in the operation of said motor.

In testimony whereof, I have hereunto subscribed my name this 30th day of August, 1926.

DONALD G. LITTLE.